United States Patent

[11] 3,594,982

| [72] | Inventor | Michael J. Pearson |
| | | Pleasanton, Calif. |
| [21] | Appl. No. | 29,894 |
| [22] | Filed | Apr. 20, 1970 |
| [45] | Patented | July 27, 1971 |
| [73] | Assignee | Kaiser Aluminum & Chemical Corporation |
| | | Oakland, Calif. |

[54] PROCESS FOR DRYING UNSATURATED ORGANIC GASEOUS COMPOUNDS
7 Claims, 2 Drawing Figs.

[52] U.S. Cl. ........................................... 55/33, 252/443, 252/463
[51] Int. Cl. ................................................ B01d 53/02
[50] Field of Search ........................................ 55/33, 74, 387; 252/443, 463; 260/708

[56] References Cited
UNITED STATES PATENTS
| 1,985,204 | 12/1934 | Derr et al. ............ | 252/443 X |
| 2,293,901 | 8/1942 | Hutchinson .......... | 55/33 |
| 2,495,278 | 1/1950 | Nickels ................. | 252/443 X |

Primary Examiner—Reuben Friedman
Assistant Examiner—R. W. Burks
Attorneys—James E. Toomey, Paul E. Calrow, Harold L. Jenkins and Andrew E. Barlay ABSTRACT: Water is removed from organic, polymerization-susceptible gaseous compounds possessing carbon-carbon unsaturation while simultaneously inhibiting polymerization, the process comprises contacting the wet gas with an active alumina composite consisting essentially of an active alumina substrate having a substantially chi-rho and eta structure, a surface of at least 300 $m.^2/g.$, a loss on ignition from about 1.8 percent to about 15 percent by weight, the surface of the substrate having an alkali modified structure of the empirical formula $MAl(OH)_2CO_3$, where M is potassium or sodium, said composite contains at least about 3 percent and up to about 25 percent by weight of $MAl(OH)_2CO_3$.

● NODULAR ACTIVE ALUMINA CONT. $SiO_2$.
○ ACTIVATED PRECIPITATOR SCALE.
△ ACTIVE ALUMINA SUBSTRATE.
× SURFACE MODIFIED DESICCANT.

PROCESS FOR DRYING UNSATURATED ORGANIC GASEOUS COMPOUNDS

MICHAEL J. PEARSON
INVENTOR

BY Andrew E. Barlay
ATTORNEY 3,594,982

PROCESS FOR DRYING UNSATURATED ORGANIC GASEOUS COMPOUNDS

BACKGROUND OF THE INVENTION

The present invention relates to a process of drying and simultaneously inhibiting polymerization of polymerization-susceptible gaseous compounds having carbon-carbon unsaturation.

Unsaturated gaseous organic compounds such as ethylene, propylene and butadiene are widely utilized in the preparation of polymers. These compounds are usually produced by the cracking of natural gas and petroleum hydrocarbons, and during manufacture and storage become contaminated with water. The amount of water contained in such gases varies with conditions of manufacture and storage, but water in any amount is undesirable when these gases are utilized as chemical intermediates for the preparation of polymers. The presence of water during polymerization can deleteriously affect the rate of polymerization and decrease the efficiency and the service life of the polymerization catalyst. Thus, moist gases must be dried prior to their utilization for the preparation of polymers.

Drying of such gases is generally accomplished by contacting the moist gas with a drying agent, active aluminas being commonly used for this purpose.

Aluminas are known to be good absorbents, their water sorption capacity is relatively high and they can be utilized for relatively long periods within a broad range of temperatures. When exhausted, they lend themselves to regeneration to provide long service life. In most instances, active aluminas behave as inert compounds without materially affecting the chemical composition of the compounds to be dried. However, when active alumina is utilized as a drying agent for unsaturated gases such as ethylene, propylene, etc., chemical reactions take place during the drying process, which on the one hand affect the chemical composition of the gases and on the other hand deleteriously lower the sorption capacity of the aluminas. The undesired reactions result in the formation of polymeric products of uncontrolled molecular weights and, the accompanying sorption of a portion of the formed polymers on the surface of the active alumina reduces the water sorption capacity. Further, the polymeric surface coatings plug the pores of the desiccant which, in turn, causes a further decrease in sorptive capacity. When such a polymer-coated desiccant is regenerated at elevated temperatures, the polymeric materials carbonize and the resultant regenerated alumina will have a much lower water sorption capacity due to the presence of carbon on the surface and in the pores.

It has now been found unexpectedly that organic polymerization-susceptible gases having carbon-carbon unsaturation can be dried without the disadvantageous effects described above. In accordance with the novel process of the invention the moist gases are contacted with an active alumina composite consisting essentially of an active alumina substrate having a substantially chi-rho and eta structure, and an alkali-modified surface containing a compound of the empirical formula $MAl(OH)_2CO_3$, where M is potassium or sodium.

BRIEF SUMMARY OF THE INVENTION

A process for drying and simultaneously inhibiting polymerization of polymerization-susceptible organic gaseous compounds containing carbon-carbon unsaturations which comprises: contacting the gaseous compounds with a composite consisting essentially of an active alumina substrate having a substantially chi-rho and eta structure, a surface area of at least 300 m.$^2$/g., a water sorption capacity of at least 18 percent at 60 percent relative humidity, a loss on ignition of from about 1.8 to about 15 percent, the surface of the substrate having an alkali-modified structure of the empirical formula $MAl(OH)_2CO_3$, where M is sodium or potassium, the composite containing at least about 3 percent and up to about 25 percent by weight of $MAl(OH)_2CO_3$.

DETAILED DESCRIPTION OF THE INVENTION

Figure 1:
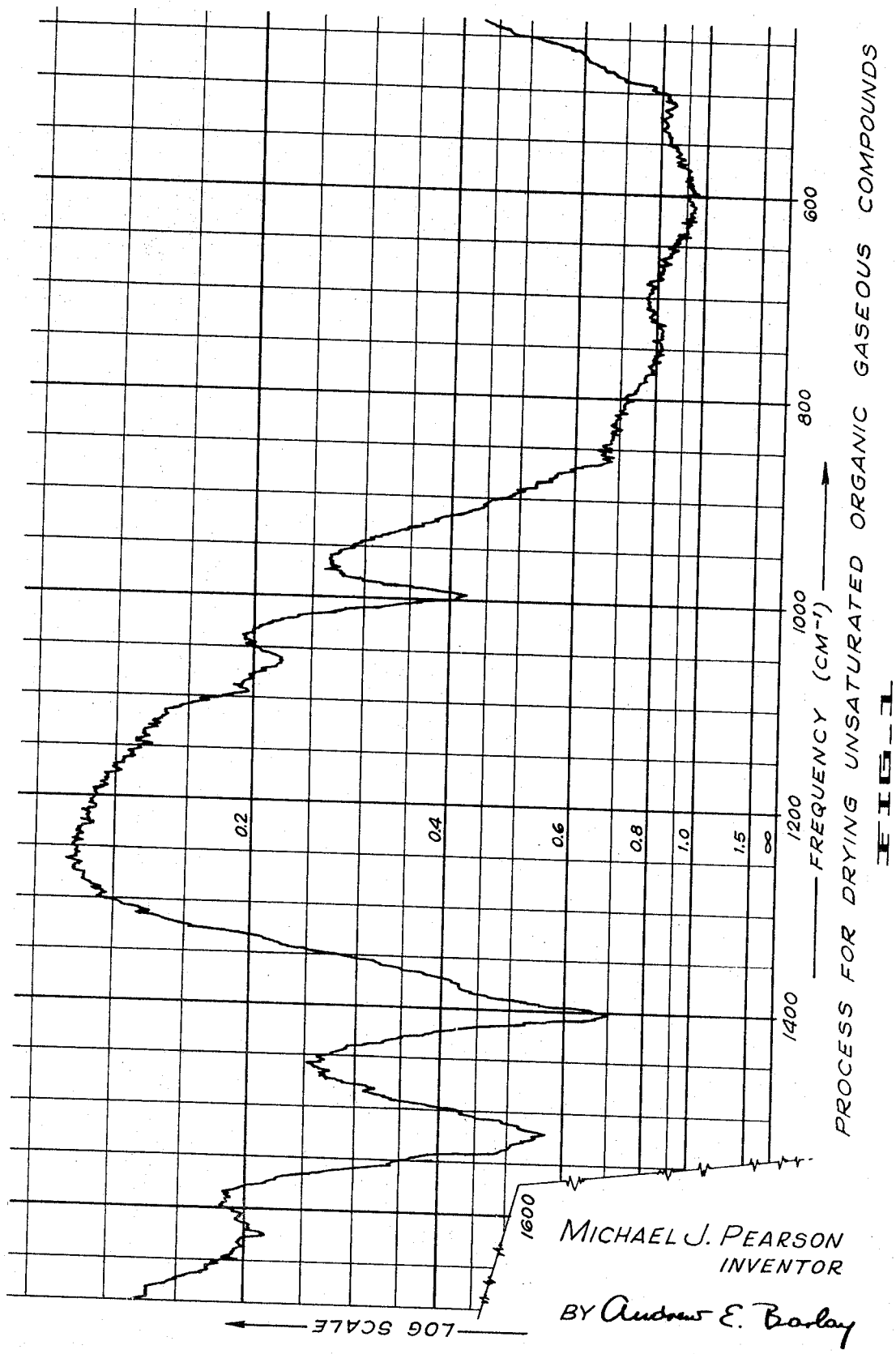
FIG. 1 shows the infrared absorption spectrum of the active alumina composite used in the present process.

The present invention relates to drying and simultaneously inhibiting polymerization of moist polymerization-susceptible organic gaseous compounds containing carbon-carbon unsaturation by contacting the moist gases with a surface modified active alumina.

More particularly, it relates to a process for drying and inhibiting polymerization during drying by contacting polymerization-susceptible organic gaseous compounds with an alumina composite comprising an active alumina substrate having a substantially chi-rho and eta structure, a surface area of at least 300 m.$^2$/g., a loss on ignition from about 1.8 percent to about 15 percent by weight, a water sorption capacity of at least 18 percent at 60 percent relative humidity, a capability of partial rehydration, the surface of the substrate having an alkali-modified structure of the empirical formula $MAl(OH)_2CO_3$, where M is sodium or potassium, the composite containing at least about 3% and up to about 25 percent by weight of $MAl(OH)_2CO_3$.

Alumina exists in a variety of physical modifications such as alpha-alumina, gamma-alumina, eta alumina, etc., depending on the manner in which they are prepared and also on the thermal treatment to which aluminas are subjected to obtain desired properties, such as for example, high capacity for moisture sorption.

One convenient method for preparing active alumina is, for example, to precipitate alumina hydrates from Bayer Process pregnant liquors, followed by filtration, drying and an activation treatment. The activation treatment is usually a thermal treatment aimed at producing active sites on the surface of the alumina.

The thermal treatment utilized in the activation process can vary between broad temperature ranges of from about 110° C. to about the temperature where the alumina is converted to corundum, which possesses few or no active sites.

It has been found that for the preparation of the active alumina composite utilized in the process of the invention, the alumina hydrates should be subjected to the so-called "flash calcination" method. In this calcination method, the alumina hydrate particles are subjected to a thermal treatment at temperatures in excess of 800° C. for time periods ranging from 10 seconds to less than 1 minute. A way to accomplish this rapid calcination is to introduce the alumina hydrate surrounded with a fuel-air mixture into a burner where the burning gases generate temperatures in excess of 1000° C. The residence time of the alumina in the burner is usually less than 1 minute and the resultant product is quenched to room temperature. The alumina thus produced is a selectively calcined transition alumina possessing a substantially chi-rho and eta structure.

It is to be understood that any rapid calcination method, resulting in a product containing a substantial quantity of chi-rho and eta alumina, can be utilized for the preparation of the selectively calcined alumina substrate. For the purposes of this invention, the expression "substantial quantity" refers to a selectively calcined alumina containing chi-rho and eta alumina in an amount at least equivalent to 50 percent by weight of the selectively calcined alumina.

The selectively calcined alumina prepared according to the "flash calcination" method exhibits a surface area of at least 300 m.$^2$/g., a loss on ignition between 2 and 10 percent by weight, a static water sorption capacity of at least 18 percent at 60 percent relative humidity. It is capable of partial rehydration, and during rehydration, the water of rehydration is chemically bonded therewith. This results in a partially rehydrated alumina of high-strength properties and other desirable physical properties, for example, excellent regenerability and high abrasion resistance.

The active alumina, the surface of which is to be modified for utilization in the drying of unsaturated organic gases, can be in powder form, granular or particulate shape. If desired, the alumina can be shaped to any desired configuration prior to the surface modification. It is also possible to accomplish shaping and surface modification simultaneously, or in a manner where the surface modification is followed by shaping.

Generally, for drying purposes shaped alumina such as spheroids, balls or rods are utilized, for several reasons. Drying of gases is usually accomplished in drying towers or absorption columns which are supplied with a substantial quantity of drying agent. The usual type of drying operation involves introduction of moist gaseous compounds at one end of the column or tower and removal of the dried gases after sufficient contact with the desiccant at the other end of the column. To provide sufficient contact with the desiccant, the column or tower is usually filled with the desiccant to a considerable height. If powdered alumina is used as a desiccant, the flow of the gases through the column is retarded and a considerable pressure drop is observed. This flow of gases can be considered as a plugged flow, which is undesirable for economic and fast drying operations. For this reason granular or shaped active alumina desiccants are preferred for absorption columns.

When granular or shaped alumina is utilized in the columns, care must be taken to ensure that the granules and shapes are strong enough. Otherwise, particularly in the lower layers which carry the weight of the alumina desiccant, crumbling will occur, resulting in the formation of dust and powder and creating the above mentioned plugged flow, pressure drop, general loss in drying efficiency and loss in material during regeneration.

Nevertheless, in certain drying operations, powdered active alumina is used and the present method of drying and inhibition of polymerization encompasses the utilization of alumina in powder, granular, or shaped form.

The surface modification of the active alumina can be accomplished in several ways. One method of surface modification involves impregnation of the active alumina by immersion in a solution containing a compound selected from the group consisting of $K_2CO_3$, $KHCO_3$, $NA_2CO_3$ and $NaHCO_3$.

In this type of surface modification treatment a carbonate containing aqueous solution is utilized, containing from about 30 grams/liter of $M_2CO_3$ or $MHCO_3$, where M is potassium or sodium. The upper limit of the concentration is usually determined by the solubility of the carbonate salt at the treatment temperature. It was found that when an aqueous potassium carbonate solution is utilized as the impregnating agent, $K_2CO_3$, concentrations of from about 50 grams/liter to about 500 grams/liter can be effectively utilized at temperatures of from about 20—75° C.

The solubilities of $KHCO_3$, $Na_2CO_3$ and $NaHCO_3$ are about 224, 226 and 82.8 g./l. respectively at 25° C. in water and the upper limit of the concentration of the solutions used to impregnate the active alumina should be adjusted according to the treatment temperature. Higher concentrations of these salts are preferred in order to accomplish the impregnation within reasonable time periods and also to obtain the desired degree of surface modification.

The temperatures utilized in the impregnation treatment can vary from about 15° C. to about 100° C. Temperatures in the range 25—80° C. were found to provide satisfactory results within a time period of from 30 minutes to about 180 minutes, lower temperatures being associated with longer time periods. The alumina, whether in powder, granular, or shaped form is admixed with the impregnating solution and agitated to obtain the desired intimate contact with the impregnating solution.

In another suitable method of impregnation, active alumina can be shaped and impregnated simultaneously. This is accomplished by admixing the active alumina either in powder or in granular form with a concentrated solution of impregnating agent, followed by a tumbling operation to shape the alumina into, for example, spherical particles. A variation of this type of impregnation involves the gradual addition of the impregnating solution during the shaping process. Combinations of these processes are also useful.

The amount of $MAl(OH)_2CO_3$ compound formed on the surface depends on the concentration of the impregnating solution, on the temperature of the impregnation and on the subsequent activation treatment. A satisfactory drying agent is obtained when the active alumina is modified to contain at least about 3 percent by weight of $MAl(OH)_2CO_3$. To obtain optimum water adsorption capacity coupled with low polymerization rates, as well as good attrition resistance, the modified alumina should contain 5—25 percent by weight of $MAl(OH)_2CO$ after drying at 140° C. (M being potassium or sodium).

Following the impregnation process, the impregnated alumina is dried. Drying temperatures in excess of 100° C. and below about 200° C. can be utilized. The temperature range of from 105° C. to about 175° C. was found to particularly suitable when the active alumina was impregnated with $K_2CO_3$. The drying temperature is not critical, but the temperature and the time should be adjusted in a manner to allow removal of free water from the pores of the impregnated active alumina.

After drying, the impregnated active alumina is subjected to an activation treatment at a temperature of from about 160° C. to about 350° C., preferably 200—300° C., for a time period of from about 30 minutes to about 2 hours. This activation treatment can be coupled with the drying process whereby the temperature of the drying oven is raised after the last traces of moisture are removed, or it can be accomplished in a separate step. The activation treatment will generally complete the surface modification of the active alumina for the purposes of this invention.

The alumina composite thus produced has a sorption capacity of at least 18 percent at 60 percent relative humidity, coupled with the capability of inhibiting polymerization of the aforementioned gaseous compound during drying.

The following nonlimiting Examples further illustrate the subject of the present invention:

EXAMPLE 1

Bayer Process alumina hydrate was selectively calcined by surrounding the alumina hydrate particles with a fuel-air mixture. The particles were conducted through a combustion zone, where a flame temperature of 1650—1900° C. was maintained. The residence time of the particles in the combustion zone was less than 1 minute and subsequently they were quenched to room temperature by cooling with a stream of dry air. The selectively calcined, cooled particles were then ground to an average particle size of 0.05 mm. and shaped to spherical nodules in a nodulizer by the addition of water. The nodules had an average diameter of about 6 mm. and the following characteristics after nodulization, curing and activation at about 380° C. for 1 hour: surface area—380 m.$^2$/g., average pore volume—0.51 ml./g., porosity—65 percent, average pore diameter in A—50, static sorption capacity at 60 percent rel. humidity—20 percent, crushing strength 22.7 kg.-force. The nodules were then impregnated at about 50° C. in a $K_2CO_3$ solution containing about 350 g./l. $K_2CO_3$ for 35 minutes. The impregnated nodules were dried at 160° C. for 90 minutes, followed by an activation treatment for 2 hours at 225° C. The activated, surface modified nodules were then subjected to infrared analysis by employing KBr pellet technique in a Perkin-Elmer Model 621 infrared spectrometer, resulting in the spectrum shown in FIG. 1.

The gaseous unsaturated compounds which can be dried without materially effecting polymerization during drying include those compounds which have one or more carbon-carbon unsaturations. The carbon-carbon unsaturation can be present as a double or as a triple bond. Representative examples of these organic gaseous compounds include: ethylene, propylene, butylene, butene, butadiene, acetylene. It should be understood that these compounds are only representative examples, and that unsaturated gases in addition to the ones described can be dried by the method of the invention.

Figure 2:
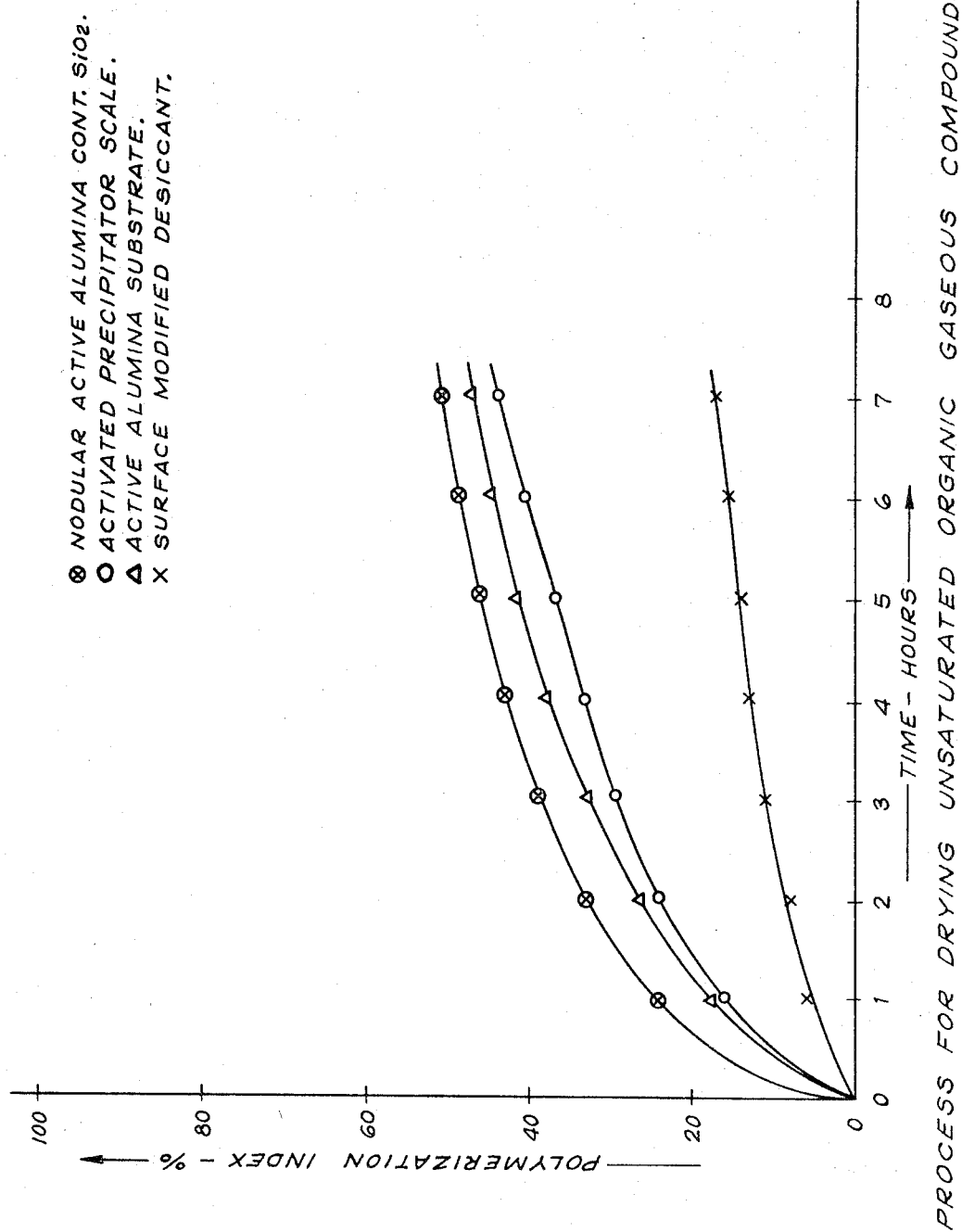
FIG. 2 shows graphically the polymerization of butadiene in the presence of commercial desiccants and also in the presence of the alumina composite such as that shown in FIG. 1.

FIG. 2 graphically compares polymerization activities of commercially available desiccants usually employed for drying gaseous unsaturated compounds and that of the alumina composite used in the practice of the present invention. The comparison tests were accomplished in the following manner:

20 gram samples of the commercial desiccants and of the alumina composite were each placed into 1 liter flasks. The flasks were evacuated, then heated to 350° C. for about 20 hours under vacuum, followed by cooling to 200° C. At this temperature, butadiene was introduced in an amount to obtain a butadiene pressure of about 0.5 atmospheres within the flask at 200° C. The butadiene-containing flasks were maintained at 200° C. for about 7 hours, pressure readings were taken at regular intervals and the pressure drop recorded. The pressure drop within the flasks indicates the degree of polymerization of the butadiene and is shown in FIG. 2. The ordinate of FIG. 2 shows the degree of pressure drop in percent, wherein the original pressure within the flask at 0 hour (0.5 atm.) was taken as 100 percent, the abscissa indicating the time in hours. The results of the comparison tests are tabulated below and also are shown in FIG. 2.

changes and the efficiency and value of the desiccant is decreased.

EXAMPLE II

Active alumina granules were prepared from Bayer hydrate by selectively calcining the Bayer hydrate as described above in Example I, to a loss on ignition of from about 3—7 percent. The selectively calcined alumina was then shaped into granules as shown in Example I, wherein the selectively calcined alumina comprising in excess of about 60 percent by weight chi-rho alumina, was agglomerated with water and cured at 70—99° C. to produce abrasion resistant alumina granules of spherical shape. The shapes were then activated at 400° C. to obtain an active alumina having a loss on ignition of about 6 percent by weight, a specific surface area of 350 m.²/g. and an average porosity of about 65 percent. This alumina was immersed into an aqueous solution containing 352 g./l. $K_2CO_3$. The solution containing the alumina was kept at 40—50° C. for 90 minutes; subsequently, the excess $K_2CO_3$ solution was removed by filtration and the impregnated shapes were dried at 140° C. for 2 hours. Following the drying, the impregnated alumina shapes were activated at 225° C. for a period of 60—90 minutes. Infrared spectrum of the alumina composite indicated the presence of about 20 percent $KAl(OH)_2CO_c$.

Twenty grams of the shaped alumina composite were then

TABLE I

Effect of Desiccant on Polymerization of Butadiene Under Standardized Conditions (200° C. temperature, equal volumes, desiccant amounts and initial butadiene pressure)

| Desiccant type | Pressure drop percent at—hours of desiccant-butadiene contact | | | | | | | Polymerization index [5] |
|---|---|---|---|---|---|---|---|---|
|  | 1 hr. | 2 hrs. | 3 hrs. | 4 hrs. | 5 hrs. | 6 hrs. | 7 hrs. |  |
| $KAl(OH)_2CO_3$ surface modified active nodular alumina [1] | 6 | 8 | 11 | 13 | 14 | 16 | 17 | 12 |
| Active alumina prior to surface modification [2] | 18 | 26 | 33 | 38 | 42 | 45 | 47 | 42 |
| Precipitator scale-activated [3] | 16 | 24 | 29 | 33 | 37 | 41 | 44 | 39 |
| Nodular active alumina containing $SiO_2$ [4] | 24 | 33 | 39 | 43 | 46 | 49 | 51 | 46 |
| No desiccant | | | | | | | 5 | 0 |

[1] $KAl(OH)_2CO_3$ surface modified active nodular alumina composite. The unmodified active alumina is prepared by flash-calcining Bayer hydrate followed by nodulization and rehydration and activation, as hereinbefore described. The activated nodules were immersed in a $K_2CO_3$ solution (350 g. $KCO$/liter) for 0.5 hour at 50° C., followed by drying at 160° for 2 hrs. and activation at 225° C. for 2 hrs. Surface area prior to impregnation 380 m.²/g.
[2] Active nodular alumina substrate. Prepared as the surface modified alumina but without subjecting it to surface modification. Surface area 380 m.²/g., L.O.I. 6.0%.
[3] Precipitator scale alumina prepared by calcination of alpha-alumina trihydrate found on the walls of Bayer hydrate precipitators, granular, surface area 210 m.²/g. after activation at 300–800° C. L.O.I. 6.8%.
[4] Nodular active alumina. Granular alumina, containing 6.3% by weight $SiO_2$, surface area 350 m.²/g. L.O.I. 6.2%.
[5] Polymerization index is the degree of polymerization in 7 hours of butadiene measured s the percentage drop in pressure caused by a desiccant under the above stated standard conditions. (A value of 5 is subtracted from the actual reading to correct for the polymerization of butadiene at 200° C. for 7 hours without desiccants.)

Thus, it can be clearly observed that the present process accomplishes substantially inhibition of polymerization of butadiene.

The following Table provides a comparison of polymerization indexes of alumina composites prepared with varying impregnating solutions.

TABLE II

Impregnating Solutions used in treating substrate

|  | $K_2CO_3$ | $KHCO_3$ | $Na_2CO_3$ | $NaHCO_3$ | Untreated substrate |
|---|---|---|---|---|---|
| Polymerization index for butadiene (7 hr. 200° C.) | 12 | 21.3 | 27.5 | 31.0 | 42 |
| Sorptive capacity at 60% relative humidity | 19.9 | 18.8 | 19.2 | 19.2 | 19.0 |

It can be noted that the polymerization inhibiting effect is accompanied by no change in sorptive capacity.

The composites can be used in adsorption columns or drying towers for a considerable length of time. After exhaustion, i.e., saturation of the alumina composite with moisture, it can be readily regenerated in the usual manner. Regeneration temperatures utilized for the removal of adsorbed moisture are generally below that required for the decomposition of the $MAl(OH)_2CO$ compound. $KAl(OH)_2CO_3$ decomposes at about 370° C. while $NaAl(OH)_2CO_3$ decomposes at lower temperatures. For best results it is recommended that the composite be regenerated at least a few degrees below the decomposition temperature. If decomposition occurs, the polymerization inhibiting characteristic of the desiccant placed into a 1-liter flask and the flask was evacuated, then heated to about 350° C. for 20 hours while under vacuum. Subsequently, the flask was cooled to 200° C. and filled by displacement to 0.5 atm. pressure with butadiene. The flask containing the composite and the butadiene, was kept at 200° C. for 7 hours and the pressure drop was periodically checked.

The pressure drop at the end of the 7 hour period was 17 percent (the starting 0.5 atm. was considered at 100 percent), indicating only a small degree of polymerization of the butadiene. A control flask containing butadiene but no desiccant was subjected to the same treatment, and self-induced polymerization was observed during this period, amounting to a 5 percent pressure drop. Thus, the composite induced only a 12 percent pressure drop (17—5), which is about 3½ times less than the pressure drop induced by commercial desiccants. (see Table I).

After the 7 hour pressure drop test, the alumina composite was reactivated at 225—250° C. for 1 hour and again subjected to the pressure drop test described above. No change in the percentage pressure drop was observed, which illustrates the good regenerability of the desiccant.

Example III

Active alumina shapes, prepared in the same manner as described in Example I, were immersed in an aqueous solution containing 220 g./l. $Na_2CO_3$. The admixture of alumina granules and $Na_2CO_3$ solution was kept at 60—65° C. for a period of 180 minutes, followed by removal of the excess $Na_2CO_3$ by filtration. The wet alumina granules impregnated with $Na_2CO_3$ were dried at about 140—150° C. for 2 hours, followed by an activation treatment at 230° C. for 1 hour. The surface modified active alumina composite contained 15 percent by weight of $NaAl(OH)_2CO_3$ as determined by differential thermal analysis.

After the 7 hours pressure drop test using butadiene, the active alumina composite was regenerated by a thermal treatment at 220—230° C. for 1 hour. The aforedescribed pressure drop test was repeated several times with little or not change in the pressure drop characteristics of the desiccant, indicating long service life coupled with good regenerability.

The pressure drop test as described in the above Examples was repeated with ethylene, propylene and butene in place of butadiene at 300° C. for a period of 18 hours. No significant pressure drop was observed. In contrast, commercial desiccants inducted polymerization which was indicated by a pressure drop of about 14—20 percent within the 18 hour period.

Having thus described the invention, What I claim is:

1. A process of drying and simultaneously inhibiting polymerization of polymerization-susceptible organic gaseous compounds containing carbon-carbon unsaturations which comprises:

a. contacting the gaseous compounds with an active alumina composite consisting essentially of an active alumina substrate having a substantially chi-rho and eta structure, surface area of at least 300 m.$^2$/g. a water sorption capacity of at least 18 percent at 60 percent relative humidity a loss on ignition from about 1.8 to about 15 percent by weight, a capability of partial rehydration; the surface of the substrate having an alkali-modified structure of the empirical formula of $MAl(OH)_2CO_3$, where M is sodium or potassium; said composite containing at least about 3 percent and up to about 25 percent by weight of $MAl(OH)_2CO_3$; and b. removing the substantially moisture-free gas.

2. Process according to claim 1, wherein M is potassium.

3. Process according to claim 1, wherein M is sodium.

4. Process according to claim 1, wherein the gaseous compounds possess carbon-carbon double bonds.

5. Process according to claim 1, wherein the gaseous compounds possess carbon-carbon triple bonds.

6. Process according to claim 1, wherein the composite contains 5—25 percent by weight of $MAl(OH)_2CO_3$.

7. In the process of drying and simultaneously inhibiting polymerization of polymerization-susceptible moist gaseous compounds according to claim 1, the additional step of regenerating the active alumina composite at a temperature of from about 160° C. to below the decomposition temperature of the $MAl(OH)_2CO_3$ compound.